United States Patent [19]

Coon et al.

[11] 4,430,653
[45] Feb. 7, 1984

[54] EARTH PROBING RADAR SYSTEM

[75] Inventors: Julian B. Coon; Charles J. Schafers, both of Ponca City, Okla.

[73] Assignee: Conoco Inc., Ponca City, Okla.

[21] Appl. No.: 218,437

[22] Filed: Dec. 19, 1980

Related U.S. Application Data

[63] Continuation-in-part of Ser. No. 90,584, Nov. 2, 1979, abandoned.

[51] Int. Cl.³ ............................................. G02S 13/04
[52] U.S. Cl. ................................................. 343/5 NA
[58] Field of Search ................................... 343/5 NA

[56] References Cited

U.S. PATENT DOCUMENTS

| | | | |
|---|---|---|---|
| 3,806,795 | 4/1974 | Morey | 343/5 NA X |
| 3,831,173 | 8/1974 | Lerner | 343/5 NA |
| 4,008,469 | 2/1977 | Chapman | 343/5 NA |
| 4,062,010 | 12/1977 | Young et al. | 343/5 NA |
| 4,072,942 | 2/1978 | Alongi | 343/5 NA |
| 4,161,731 | 7/1979 | Barr | 343/5 NA X |
| 4,218,678 | 8/1980 | Fowler et al. | 343/5 NA X |
| 4,297,699 | 10/1981 | Fowler et al. | 343/5 NA |

*Primary Examiner*—T. H. Tubbesing
*Attorney, Agent, or Firm*—William J. Miller

[57] ABSTRACT

A ground probing radar method and apparatus which is effective to view the earth in advance of coal mining activity provides visual display of a coal seam and particular discontinuities that may lie therein. The system operates in the frequency range of 10 Megahertz to 5 Gigahertz. The received electromagnetic energy is amplified, sampled and band pass filtered with subsequent time gain amplification. A time analog return signal may be viewed directly and/or the return signal may be digitally processed to enable further signal refinement. A control microprocessor is utilized for both tape record control and digital signal processing, and the processor includes the capability for compositing and/or stacking of common source point data for output record and display.

30 Claims, 15 Drawing Figures

EARTH PROBING RADAR SYSTEM

CROSS-REFERENCE TO RELATED APPLICATION

This application is a continuation-in-part of U.S. Application, Ser. No. 90,584, as filed on Nov. 2, 1979 under title of "Earth Probing Radar System", now abandoned.

BACKGROUND OF THE INVENTION

1. Field of the Invention

The invention relates generally to radar systems for earth probing and, more particularly, but not by way of limitation, it relates to an improved method and apparatus for use in surveillance and hazard protection in and around coal in situ and at the coal seam work face.

2. Description of the Prior Art

There have been previous attempts to use radar to explore geologic materials, but most of this work has been unsuccessful except when used in salt or extremely dry formations. In most previous operations the approach has been to apply radar technology as developed by the Aerospace industry with direct application to ground probing. The methods of recording and subsequent signal processing that have been utilized in the Aerospace industry were directed toward enhancing system signal to noise in the presence of random noise, and they produced reliable indication only at very short depths of penetration, on the order of a few feet. These efforts are exemplified by U.S. Pat. Nos. 3,806,795; 3,831,173; and 4,072,942. In a more recent development, U.S. Pat. No. 4,008,469 discloses a hybrid short pulse radar system for earth probing, but here again the digital processing scheme is directed toward enhancing system signal to noise in the presence of random noise. No prior art teaching for earth probing radar is directed to overcoming the problem of source coherent noise or interference, i.e., multiples and other reflections from undesired objectives.

SUMMARY OF THE INVENTION

The present invention contemplates a ground probing radar method and apparatus which is effective to view the earth in advance of coal mining activity to provide visual display of a coal seam and particular discontinuities that may lie therein. The radar method operates in the frequency range of 10 Megahertz to 5 Gigahertz and employs received signal processing, both analog and digital, which aims to reduce problems inherent with source coherent noise or interference as well as random noise. The received electromagnetic energy is amplified, sampled and band pass filtered with subsequent time gain amplification; thereafter, a time analog return signal may be viewed directly and/or the return signal may be digitally processed to enable further signal refinement. A control microprocessor is utilized for both tape record control and digital signal processing, and the processor includes the capability for compositing and/or stacking of common source point data for output record and display.

Therefore, it is an object of the present invention to provide a ground probing radar for surveillance in coal mines, i.e., detection of discontinuities, abandoned well bores, etc.

It is yet another object of the present invention to provide a coal seam probing radar having relatively long effective range while utilizing electronics that are permissible within the inmine standards of the industry, e.g., MSHA Standards.

It is further an object of this invention to provide earth probing radar apparatus which may be suitably positioned along vertical or horizontal borehole clearances to provide radar indication of the surrounding earth formations.

It is still another object of this invention to provide a ground probing radar apparatus having low power requirement and sufficient range with subsequent signal processing capability for materially reducing source coherent interference.

It is also an object of the invention to provide ground probing radar apparatus having the capability to perform common reflection point stacking within the apparatus itself in order to reduce source coherent interference.

Finally, it is an object of the invention to provide a method for continually ascertaining the homogeneity of structure in a coal seam in advance of coal mining machinery.

Other objects and advantages of the invention will be evident from the following detailed description when read in conjunction with the accompanying drawings which illustrate the invention.

BRIEF DESCRIPTION OF THE DRAWINGS

FIG. 6 is a block diagram of filter circuits as utilized in the control unit of FIG. 5;

FIG. 8 is a block diagram of a time gain function circuit as utilized in FIG. 5;

FIG. 9 is a block diagram of microprocessor circuitry as utilized in the control unit of FIG. 5;

DETAILED DESCRIPTION OF THE INVENTION

Figure 1:
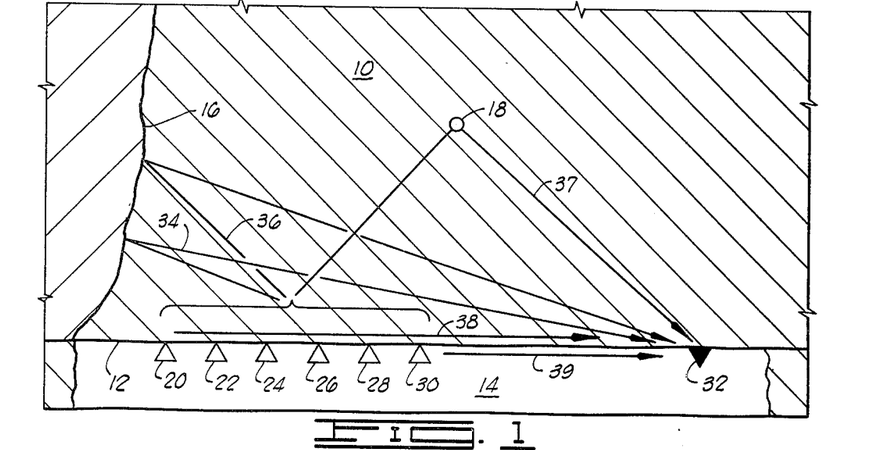
FIG. 1 is a top plan view of coal seam and mine face with a particular radar transmitter-receiver array.
Figure 2:
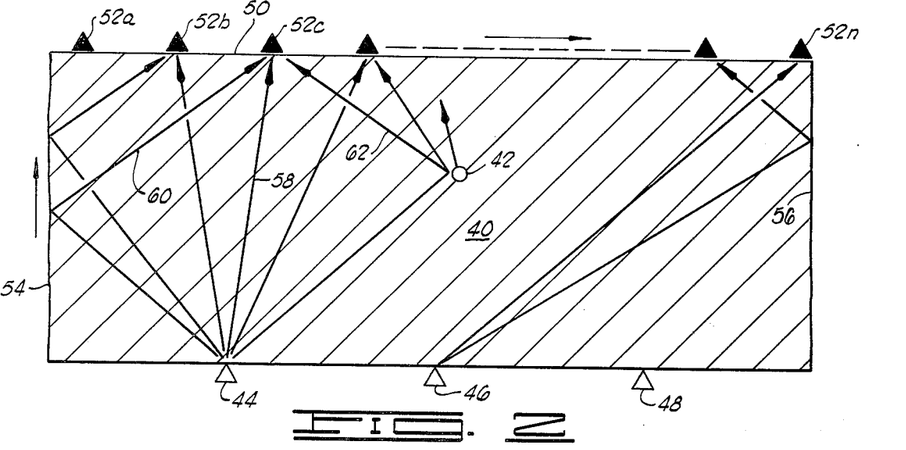
FIG. 2 is a top plan view of a coal mine pillar having a particular radar transmitter-receiver array.
Figure 3:
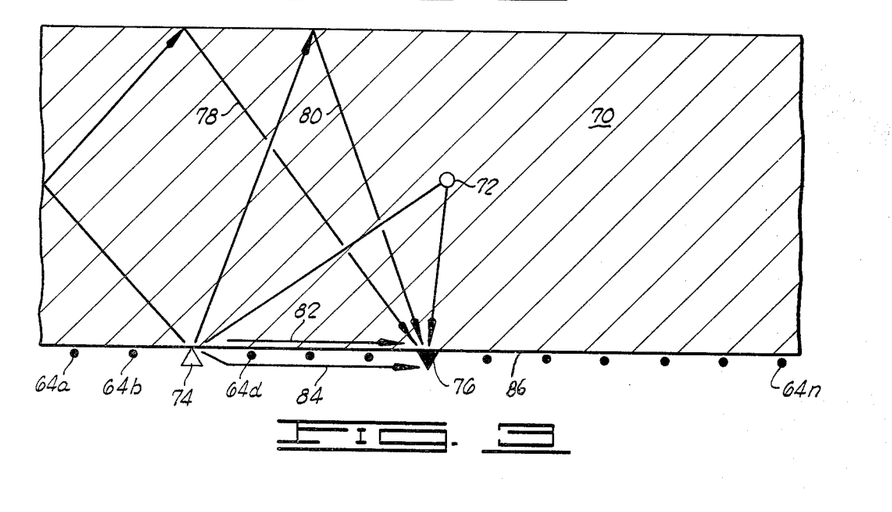
FIG. 3 is a top plan view of a coal mine pillar having yet another radar transmitter-receiver array.

In accordance with the objectives, the invention is directed to providing a reliable type of ground probing radar which can be used, in a first instance, to ascertain the condition and presence of anomalies in a coal seam in advance of the mining machinery. FIGS. 1, 2 and 3 illustrate some of the most probable applications wherein such equipment is utilized. FIG. 1 illustrates a coal seam 10 and mine face 12 adjacent a mine tunnel section 14. There are present in coal seam 10 a discontinuity 16, e.g., a clay vein or void, and an abandoned and unrecorded well bore 18 for purposes of illustration.

In this case, radar reflection testing is illustrated where a radar transmitter is energized at a plurality of preferably equally-spaced transmitter positions 20, 22, 24, 26, 28 and 30, etc., to propagate energy into the coal seam 10 for reception at a radar receiver installation at a position 32. There is also illustrated the geometry of source coherent interference by the multiple ray paths of FIG. 1. That is, for energization of the radar transmitter at a given source point, e.g., source point 26, primary reflection paths as illustrated by only two ray paths 34 and 36, would be incident on receiver position 32 from along the entire or a good portion of discontinuity 16. In like manner, the well bore 18 will provide its characteristic radar return as incident along ray path 37 to receiver position 32. Also, a direct path in coal 38 and direct path 39 in air are illustrated. As will be further described below, the radar system of the present invention functions through both improvement of signal to noise and definition over source coherent interference to detect reliable receiver output signals for visual display of the various undesired positions within coal seam 10. This may utilize various combinations of common source point positioning and/or digital stack processing depending upon the exigencies of the particular operation.

FIG. 2 illustrates another coal mine application wherein a coal pillar 40, as may contain a well bore 42, is analyzed both as to dimension and anomaly by radar transmission testing. That is, a plurality of radar transmitter source points 44, 46, 48, etc., are shot in equispaced sequence with reception of the electromagnetic energy on the opposite rib 50 of coal pillar 40. Generally speaking, coal pillars are rectangular and such transmission testing can disclose any undesired anomalies within the pillar 40 as well as providing a readout of the coal pillar dimensions by analysis of the energy travel times through the coal. Equi-spaced receiver positions are indicated at 52a, 52b through 52n. In the case of transmission testing, the source coherent noise can be identified as the direct ray paths versus the propagation paths reflecting from side ribs 54 or 56 as well as the other anomalies such as well bore 42. The propagation paths from source 44 to receiver point 52c show the multiple paths as a direct path 58, multiple side rib reflection paths as illustrated by path 60, and a well bore reflection path 62. Similar multiples would occur for each source point-receiver point combination.

Yet another mode of operation is illustrated in FIG. 3 wherein radar energy is transmitted from a plurality of equi-spaced transmitter points 64a, 64b, . . . 64n as received at one or more of a plurality of like receiver points. Thus, a coal pillar 70, including a well bore 72, may be examined for dimension and anomalies by means of sequentially positioned radar transmitter 74 and radar receiver 76. In the reception mode, the source coherent interference is further complicated by the presence of not only multi-wall interface reflection as shown by reflection paths 78, but single-wall reflection paths 80, direct propagation path 82 in coal, and the propagation path of the transmitted energy in air as shown by arrow 84 along the front rib 86 of pillar 70. However, here again the source coherent interference can be eliminated or sufficiently reduced by processing in accordance with the present method so that reliable data indicating targets within the coal seam are detectable.

Figures 4, 5:
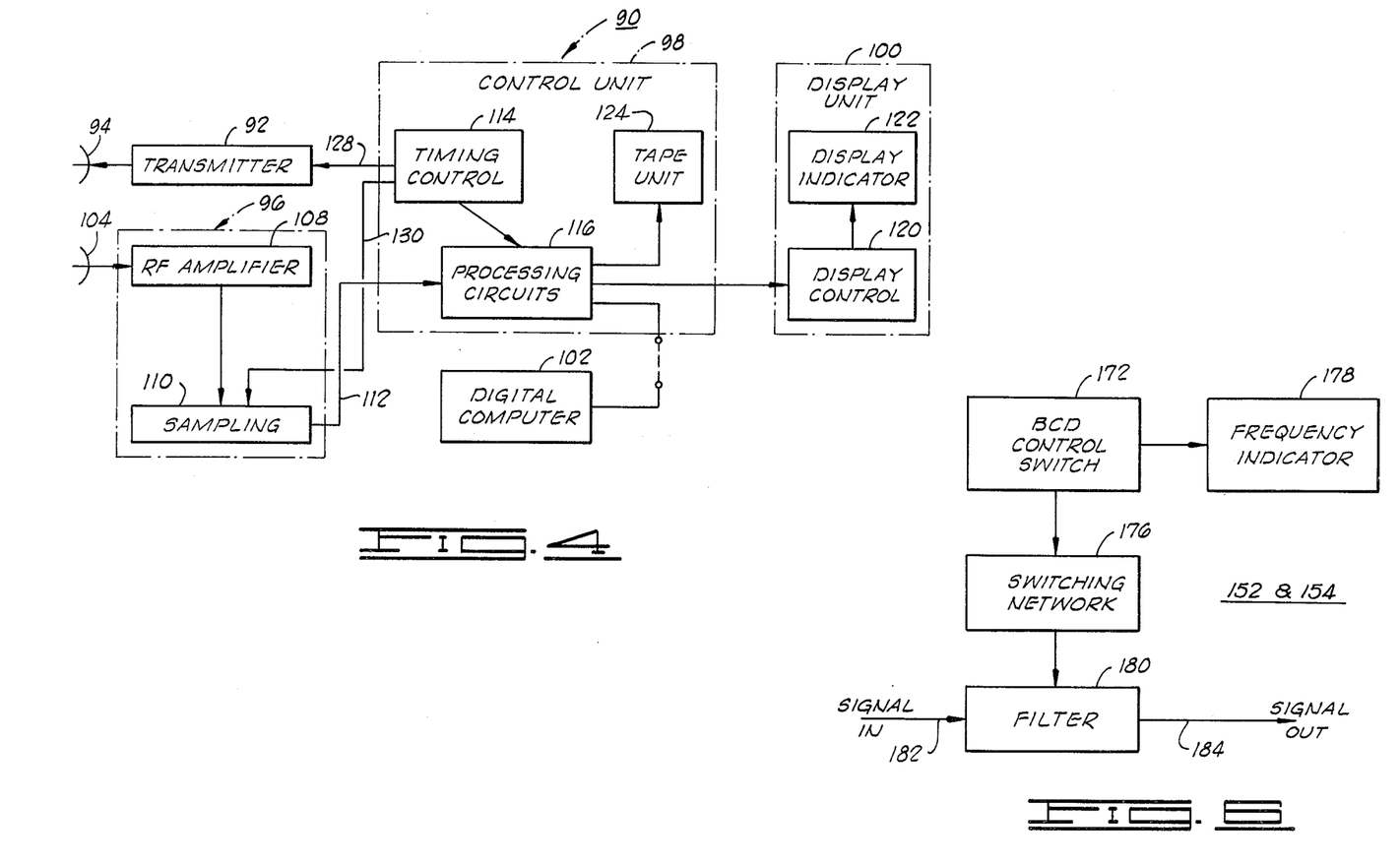
FIG. 4 is a block diagram of ground probing radar as constructed in accordance with the present invention.
FIG. 5 is a block diagram of a control unit as utilized in the system of FIG. 4.
Figure 5:
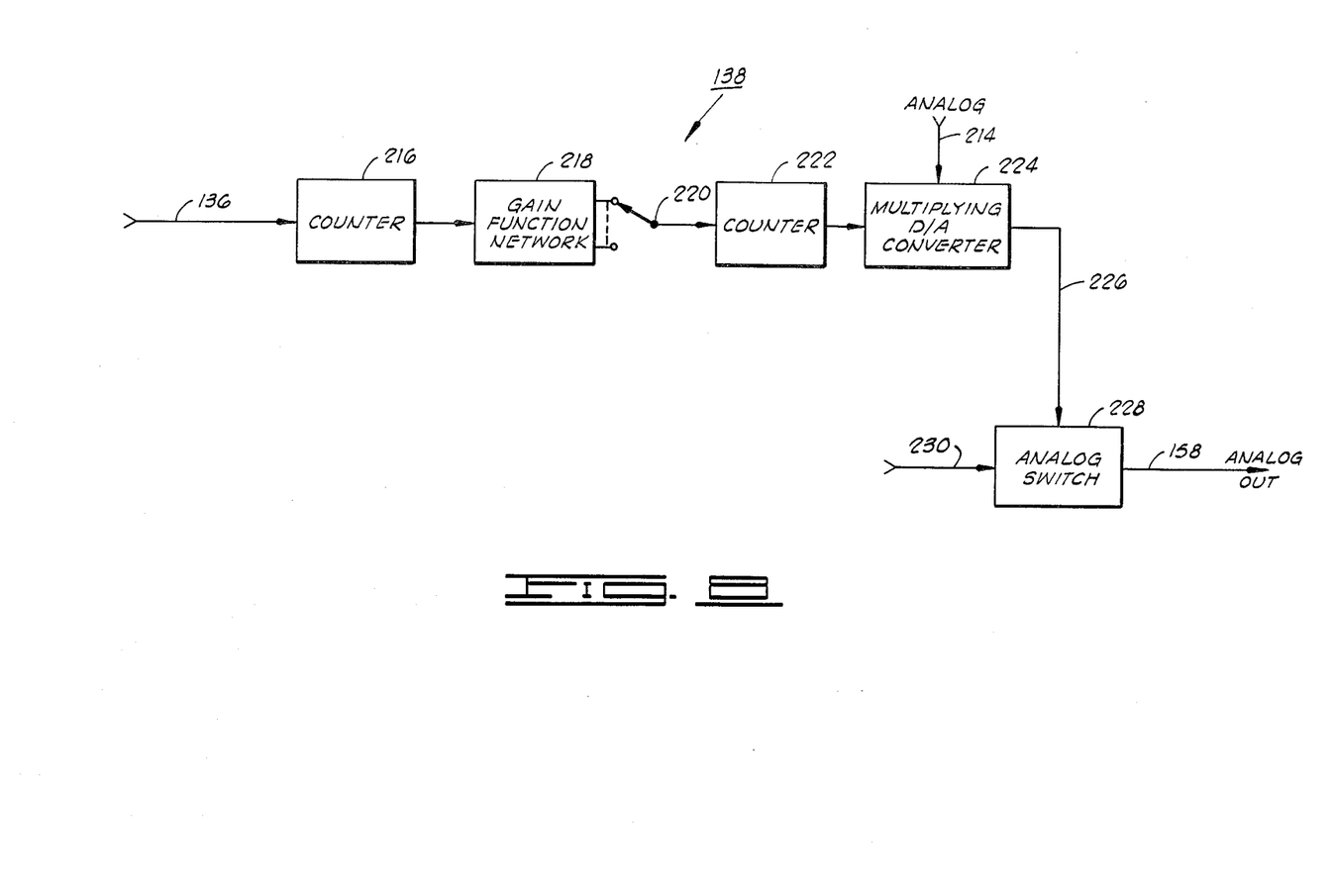

FIG. 4 illustrates the basic block diagram of a ground probing radar apparatus 90. The apparatus uses a conventional radar transmitter 92 and broadband transmission and reception antenna 94 but the preferred form is for the use of separate antennas. It is preferred, too, for best detection ranging, that transmitter 92 operate in a frequency range of 40 Megahertz to 640 Megahertz, very good results having been achieved with transmitter and broadband antenna having center frequency output at 120 Megahertz. There is, or course, some variation on best transmission frequency, and this may be adjustable with consideration of the condition of the coal seam, i.e., moisture content, etc. The apparatus 90 consists of four principal subsystems, i.e., transmitter 92, receiver section 96, control unit 98 and display unit 100. Power and timing signals to transmitter 92 are supplied by control unit 98 in like manner to prior art forms of ground probing radar. The transmitter 92, receiver section 96 and control unit 98 are designed in accordance with power permissibility requirements for in-mine usage; however, display unit 100 may be located at a remote position and functioning under normal power consumption. Also, a digital computer 102, e.g., one of the well-known forms of mini-computer, may be suitably disposed to receive data transmission from control unit 98 for further processing and display.

The receiver 96 consists of a broadband antenna 104 providing input to a conventional form of radar receiver RF amplifier 108, a wide band radio frequency amplifier; and, an increased signal level output is supplied to a sampling circuit 110 such that the radio frequency signal is shifted down to a usable audio frequency range at output 112. The wide band amplifier 108, Avantek Inc., type UTO 1002, is standard and conventional radar circuitry, and sampling circuit 110 may be such as is utilized in conventional sampling oscilloscopes and as particularly described at page 172 "Electronic Components and Measurements" by Wedlock et al., Prentice-Hall Inc., 1969. Such a sampling circuit is effective to build a pulse on the order of one millisecond from a plurality of successively delayed samples thereby to provide a much lower frequency indication. Thus, a sample derived every ½ nanosecond, or 2 billion samples per second, may be effectively reduced to the frequency range of 5 Kilohertz.

The sampled receiver output on lead 112 is then applied to control unit 98 which includes all circuitry for timing control and signal processing. A timing control circuit 114 provides system timing outputs to each of transmitter 92, receiver section 96 and processing circuits 116, and the processing circuits 116 provide outputs to a tape unit 124, display control 120 of display unit 100, and a digital computer 102. A display indicator 122 may be any of various commercially available displays such as a facsimile recorder, storage oscilloscope, photographic recorder or many other of the geophysical recorder types.

FIG. 5 is a block diagram of control unit 98 in greater detail. The control unit 98 performs three main functions; it provides power and timing signals to the transmitter 92 and receiver section 96; it also processes the received radar signal wave form as supplied at input 112; and, it records the analog and/or digital data on magnetic tape in tape unit 124. All of the various functions including control of tape unit 124 are carried out by the microprocessor circuit 126.

The timing control circuit 114 provides output leads 128 and 130 to the radar transmitter and receiver, respectively. In addition, output clock and scan start timing functions are present via lines 132 and 134 to tape unit 124, and via line 136 to time gain amplifier 138, to be further described. The range control 140 and zero time control 142 are set by potentiometer control at the front panel in well-known manner. Range control 140 determines the length of time that the receiver is activated, and this is presently designed to allow variation from 50 nanoseconds to 2000 nanoseconds. The zero time control 142 is set to determine the position of the start of the received signal relative to the transmitted signal, and this may be varied from plus 500 nanoseconds to minus 500 nanoseconds. The zero time control 142 is utilized to help account for variable cable length between the transmitter and receiver.

The received radar signal, after wide band amplification and sampling, is applied on line 112 into an amplifier 144 where the return signal level is amplified to an amplitude capable of being input to the recorder or tape unit 124. Amplifier 144 has two modes of operation as controlled by an AGC switch 146. In the ON position, AGC input is applied via lead 148 from microprocessor circuit 126 as the microprocessor examines the output of the digitizer and sets the gain of the amplifier so that the maximum value of the signal is matched to the maximum allowable input to the analog to digital converter 150. If the AGC switch 146 is in the OFF position, the gain may be controlled in well-known manner by front panel control to a desired amplitude factor.

The amplified signal output from amplifier 144 is then applied serially through a high pass filter 152 and a low pass filter 154. The filtered signals are then applied to time gain amplifier 138, as controlled by a front panel input 146 setting the selected time gain function, and time gain amplifier 138 serves to amplify a later portion of the trace or signal with respect to the earlier portions in accordance with a selected ramp function, as will be described below. The output from time gain amplifier 138 via a lead 158 can then be recorded either in analog format through file marker circuit 160 to tape unit 124, or it may be applied to analog to digital converter 150 for digitization and input to microprocessor circuit 126, as will be further described.

Alternatively, a scan ramp generator 161 may be utilized for signal processing within timing control 114. The scan ramp generator 161 (FIG. 7), to be further described, is utilized for a mode of operation wherein received radar signals are stacked in accordance with transmitter-receiver displacement correction, i.e., common reflection point stack. Thus, the offset distances for source to receiver for each series of transmitted and received radar signals are corrected to remove effects of source-receiver separation, and thereafter the signals are stacked in microprocessor circuit 126 to provide common reflection point data output. This data operation may also be carried out in computer from tape record output of tape unit 124.

The tape unit 24 is a variable speed cassette recorder which has a four channel red/write capability. The tape unit utilized is that which is known commercially as the PHI-DECK type and is available from Tripe I, Inc. of Oklahoma City, Okla. The tape unit 124 includes the electronics to allow for either analog recording or digital recording. In the analog mode, the tape is driven at 3¾ inches per second, and one channel records the clock and start of scan pulses using amplitude modulation while a second channel records the radar data using frequency modulation. IRIG intermediate band parameters are employed in well-known manner. The digital record electronics is capable of recording four traces of phase encoded data at 2800 bits per inch. The availability of two parallel sets of electronics allows the radar operator to determine the record mode in the field, while also allowing him to change the mode of operation by simply throwing a switch and changing tapes.

The microprocessor circuit 126 controls the tape recorder speed while also providing a data buffer for the digital read/write electronics in the tape unit 124. The microprocessor circuit 126 also sets the file member in the file display 162 so that the operator is apprised of that data file which is being recorded. The record playback or tape control 164 is also interfaced through the microprocessor circuit 126.

Microprocessor 126 receives signal inputs via line 166 from analog to digital converter 150. In the digital mode of operation, the microprocessor 126 accepts the digitized radar trace on lead 166 in order to perform further processing. The principal operations utilized within the microprocessor 126 are stacking and compositing operations as are well-known in the geophysical trace data processing operations. Thus, and in accordance with common source data offsets and similar time differential considerations, the trace data from consecutive trace signals are added together as they are recorded. This operation has the effect of increasing the signal to noise ratio of the signal and allows for the recording of what normally would be weak signals in greater amplitude. Data output via line 168 is in a 16 bit format, this allowing for increased dynamic range as compared to analog recorded data, and a digital to analog converter 170 allows for digital to analog conversion for selected playback and display of the digital data.

FIG. 6 illustrates each of the filter networks 152 and 154 (FIG. 5) in greater detail. Thus, whether it be a high pass or a low pass filter, the control and switching networks are identical. A front panel thumbwheel switch 172, standard type from EECO Inc., provides a binary coded decimal output to a resistor switching network 176, Siliconix type DG-201. The switch output is also digitally read out for front panel indication by an LCD frequency indicator 178. The respective high and low pass filters are programmable by use of the network of resistors as the resistors are switched into the active filter circuits to set the value of cut-off frequency. The cut-off frequency is then displayed via front panel LCD at frequency indicator 178. Thus, the active filter 180 receiving a signal input 182 with a signal output 184 is band pass controlled by switching network 176. In each of the serial filters 152 and 154 (FIG. 5), the high pass filter 152 is a four-pole Bessel filter in order to reduce ringing at the corner frequency, and the low pass filter 154 is a four-pole Butterworth design, both being conventional active filters.

Figure 7:
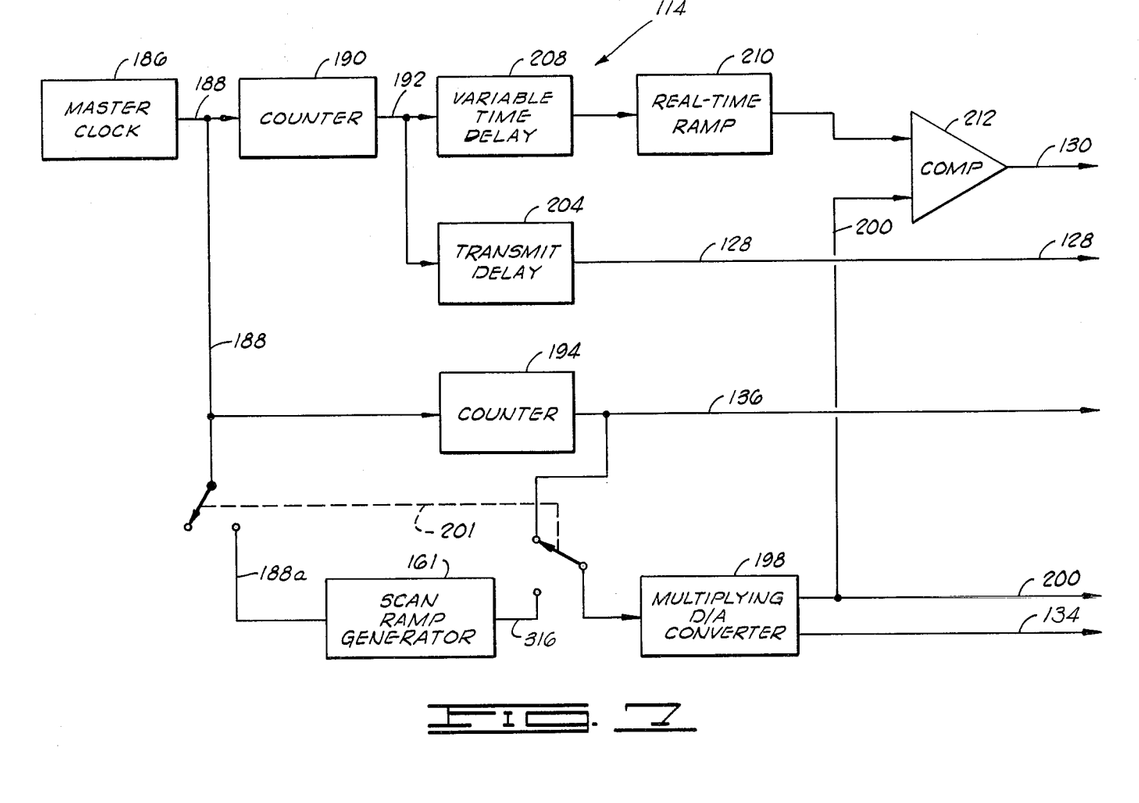
FIG. 7 is a block diagram of timing control circuits as utilized in FIG. 5.

FIG. 7 illustrates the timing control circuits 114 in greater detail. A master clock oscillator 186 of well-known type and commercially available as Connor-Winfield Type 514-R, provides basic clock frequency output at four Megahertz on lead 188. The clock signal on lead 188 is applied to a conventional type of counter 190, a 16:1 counter, type CD 4520, that provides a further reduced frequency output of 50 Kilohertz on lead 192. The basic clock frequency signal on lead 188 is also applied to a 8:1 counter 194, type CD 4520, which provides a 500 Kilohertz output on lead 136 for strobe of the time gain and/or scan ramp functions, while also applying input to multiplying digital to analog converter 198, Analog Devices type AD7541. The converter 198 then provides a linear scan ramp output on a lead 200 and start of scan pulse output on a lead 134. A switch 201 serves to enable a non-linear scan ramp output by applying clock output lead 188 to the non-linear scan ramp generator 161 (FIG. 11) as will be further described. This circuit is utilized for the common reflection point stacking operation.

The 50 Kilohertz output on lead 192 is also applied to a transmit delay 204, one-shot type 74121, which provides a fixed delay output on lead 128 to transmitter 92 (FIG. 4). The 50 Kilohertz pulse on lead 192 is also applied to a variable time delay circuit 208, type 74121, which may be front panel adjusted to set receiver timing. The output from delay 208 is applied to a real time ramp circuit 210, a radar range adjustment. The output from real time ramp 210 is then applied to one input of a comparator 212 while the other input receives the scan ramp output via lead 200 from converter 198. The comparator output on lead 130 then constitutes the receiver timing pulse as applied to receiver 106. The comparator 212 may be a modular component such as National Semi-conductor, type LM 361, and the mutiplying digital to analog converter 198 may be such as is available from Analog Devices, Type AD 7451.

The timing control circuits 114 (FIG. 7) provide high speed timing signals via leads 128 and 130 to the transmitter and receiver, respectively, while also providing the time gain and scan length signals. The received pulse from variable time delay 208, as controlled on front panels, determines the time of the first received sample, i.e., plus or minus 500 nanoseconds, with respect to the transmit strobe pulse. The delayed receiver pulse then starts a real time ramp generator 210 and the length of the ramp is also determined by a switch on the front panel. The real time ramp voltage is then compared to the scan ramp voltage in order to generate the actual receive strobe or output from comparator 212. The duration of the scan ramp length is generally on the order of 100 milliseconds while the real time ramp repetition rate from ramp generator 210 is on the order of 50 Kilohertz.

Thus, approximately 5000 transmit pulses may be used to form a single return radar trace as the scan ramp and start of scan pulses on respective leads 200 and 202 are utilized in the microprocessor circuit 126 to control the processing of received data.

FIG. 8 illustrates the time gain amplifier 138 with analog input via lead 214 from low pass filter 154 (FIG. 5). Clock pulses from the scan generator or counter 194 via lead 136 (FIG. 7) are applied to first counter 216, an 8:1 counter, which provides output to a gain function network 218. Gain function network 218 is an erasable programmable read only memory (EPROM), INTEL type 2704, and the time gain function is selected in accordance with requisites as time gain amplifier 138 supplies audio gain as well as the necessary time gain functions. The time gain amplifier rate may be controlled by one of three clock rates which are selectable by the operator from the front panel; that is, the selected clock rate enables the amplifer 138 to complete its function in 1, ½, or ¼ of a scan. When a scan is complete, the counters are reset.

The output from counter 216 addresses the gain function network 218 which is capable of having up to 8 time gain functions as selectable via switch 220. Thus, the serial output of the gain function network 218 may be selected and gated to output with the basic clock of the gain function network 218. The gated signal output from switch 220 then increments a counter 222, an 8:1 counter, which addresses a multiplying digital to analog converter 224 as it receives the analog input signal on lead 214 from low pass filter 154 (see FIG. 5). As the analog signal is applied via lead 214 to the input of converter 224, the addressing of converter 224 causes the output on lead 226 to have a time gain rate applied to the analog signal. This analog signal is then applied to a conventional form of analog switch 228 for inclusion of a range marker signal input on lead 230 with an analog output present on lead 158 as may be applied through file marker stage 160 (see FIG. 5) for analog recording. Range markers on lead 230 may be generated by any of the various conventional means, e.g., a multivibrator generator providing a 20 Hertz differentiated square wave output denoting the position along the radar transverse. The range mark control also acts to control the compositing and stacking functions by telling the processor when to record a new data trace.

FIG. 9 illustrates in block diagram form the microprocessor circuit 126. A control processor 232 accepts intput from the various portions of the control unit 98 and acts to control the processing and recording of the radar data. In the analog mode, the control processor 232 only acts to control the tape recorder unit 124. However, in the digital mode, the operator can input the number of traces to be stacked and the control processor 232 functions to add the designated number of traces together. Then, when the stacking operation is complete, the tape format processor 234 functions to write the data to tape in tape unit 124. In the meantime, the control processor 232 is operating to stack the next series of traces. The tape format processor 234 and the control processor 232 share a section of memory, random access memory 236, that is also used as the stacking and output buffers. Further, the format processor 234 controls the speed of the tape unit 124 (FIG. 5) so that it will be in completion of a recording cycle when the new trace is ready for recording.

Both the control processor 232 and the tape format processor 234 are presently designated as Motorola, type 6802 and the random access memory 236 may be such as Harris, type 6504. A read only memory 238 functioning with control processor 232 may be Intersil, type 6653, 4K and a read only memory 240 operating through tape format processor 234 is Intersil, type 6653, 2K. Connection 166 to control processor 232 provides data input on a lead 242, EOC/status input on a lead 244, and return of START control via lead 246. File marker 160 (FIG. 5), via connector 248, provides input of file number, trace number and marker trace by respective leads 250, 252 and 254. The output to digital to analog converter 170 (see FIG. 5) is applied in the form of data output on a lead 256 with an auxiliary connection provided via connector 258. A gain range output on lead 260 is available for front panel indication, and lead 262 provides a parallel data output, 16 lines and strobe pulse, for input to an auxiliary computer, e.g., digital computer 102 of FIG. 4. Output 264 from control processor 232 provides front panel processor control.

Internally of microprocessor circuit 126, addressed data is supplied via lead 266 from random access memory 236 as data and control pulse interchange is conducted on connection 268. Control processor 232 provides transfer output to tape format processor 234 via lead 270 with return of status pulse indication on lead 272. Tape format processor 234 then interconnects to random access memory 236 to provide data via bus 274 with interchange of address data on bus 276. A plurality of outputs on connection 278 from tape format processor 234 provide the necessary control output to tape unit 124 (FIG. 5). Thus, tape motion, tape data, and speed select, are provided on respective leads 280, 282 and 284 with bi-directional data as to tape data and tape status interchanged via connectors 286 and 288.

Under control of tape format processor 234, the variable speed tape unit 124 (FIG. 5) has the capability of recording tape at a constant density even though the radar unit functions at variable data rates. Without such a feature, the tape controller or tape format processor 234 would require either a large data storage buffer or the tape drive mechanism would require an extremely high speed start-stop capability. Either of these two operations would be difficult to achieve in a low power unit such as the present one which is designated for permissibility in coal mine operations.

Tape format processor 234 functions to write an identification block at the beginning of each series of records, i.e., files, so that the data can be properly identified upon playback. Tape playback can be accomplished by two means. First, if all of the recorded data is played back, then the tape format processor 234 functions to read each digital record with output of these values to a computer connector, i.e., from tape format processor 234 through random access memory 236 and control processor 232 for output on connector 262. In addition to the digital output capability, an analog output may be constructed for any display device of the conventional types which might be connected. In the second playback mode, the operator can select a desired record filed from the front panel and the microprocessor circuit 126 searches the tape until the selected file is found whereupon data is output in the same format until end of file is encountered.

Figure 10:
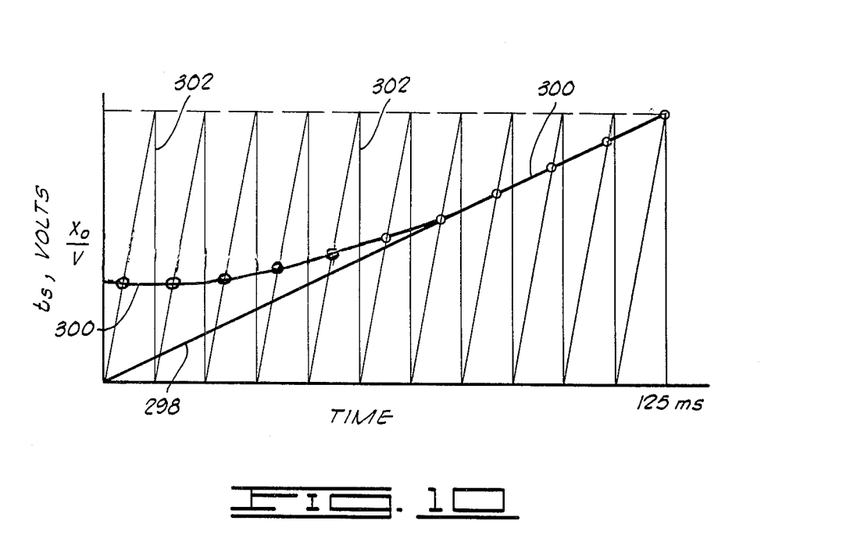
FIG. 10 is a graph of voltage vs. time illustrating a non-linear scan ramp as utilized in the invention.

FIG. 10 illustrates the linear scan ramp 298 as output from multiplying D/A converter 198 (FIG. 7) and utilized for normal compositing operation without regard to source-receiver offset. Thus, linear scan ramp 298, e.g. 125 milliseconds, is generated by multiplying D/A converter 198, and a real time ramp 302 (FIG. 10) with length equal to window length, e.g. 200 nanoseconds, is generated in ramp generator 210 (FIG. 7) for parallel input to comparator 212. The real time ramp 302 is repeated at the pulse repetition rate, e.g. 50 KHz, and comparator 212 then derives time-sliced sample output, e.g. ½ nanosecond duration, each time the upsweep voltage of real time ramp 302 compares with the scan ramp voltage 298. This is a linear sampling process effective for pulse return compositing and random noise interference reduction.

Both random and coherent noise rejection can be achieved in an alternative stacking mode of operation wherein common reception point data processing is effected. Thus, activation of switch 201 (FIG. 7) serves to substitute scan ramp generator 161 (FIG. 11) for input to multiplying D/A converter 198 (FIG. 7) thereby to impose a selected non-linear ramp function for the linear time gain function, as will be further described.

An initial calibration will reveal the energy velocity in the particular coal medium, so that energy travel times can be continually computed for a particular source-receiver offset. Thus, energy travel time from a given source to a selected receiver at offset X will adhere to the equation $$T_x = \sqrt{t_o + (X^2/V^2)}$$

where, $T_x$ equals two-way reflection time for offset X,
$t_o$ equals two-way reflection time at zero (0) offset,
x is equal to offset distance, and
V is equal to velocity of the radar energy in the particular coal medium.

The graph of the FIG. 10 illustrates a non-linear scan ramp voltage 300 with superimposition of real time saw tooth impulses 302 for a particular offset quotient, i.e. X/V. For a selected scan length of 125 milliseconds, a sample o the order of ½ nanosecond in duration is enabled on the upsweep of every real time saw tooth 302 as it compares with the X/V voltage of the non-linear scan ramp curve 300. A distinctive scan ramp curve 300 is then available for each particular offset or X/V value as selected for the particular radar survey. Thus, data input to the microprocessor circuit 232 (FIG. 9) for the particular offset distance X and velocity V completes the initial curve of non-linear scan ramp 300 before energization of the transmitter-receiver series. Data output from control microprocessor 232 is in the form of a SET pulse output 304 and an eight bit binary PRESET output on connector 306. The SET input serves to signify commencement of sampling while the PRESET data controls the curve shape in accordance with the particular X/V function.

Figure 11:
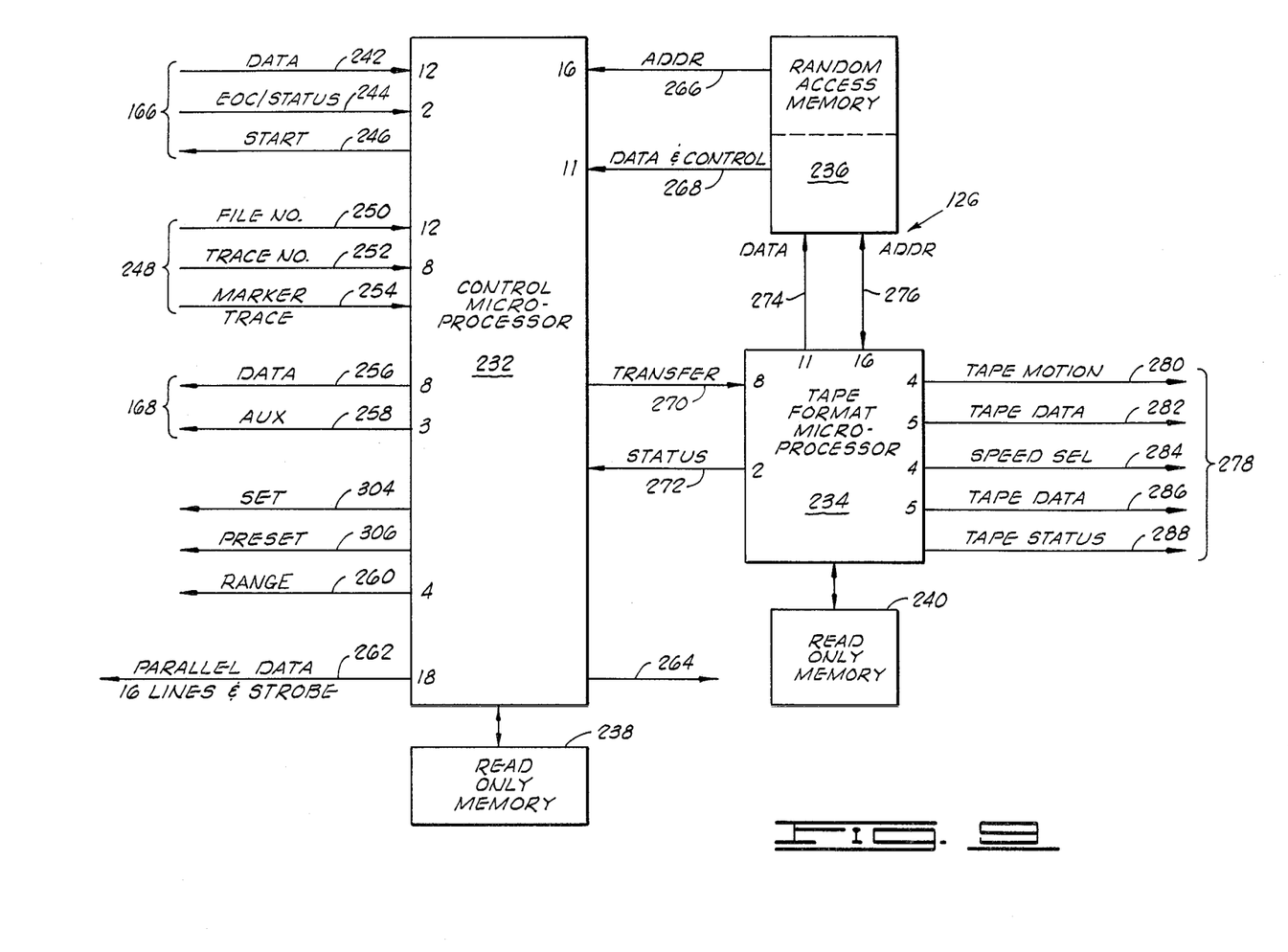
FIG. 11 is a scan ramp generator as utilized in the present invention.

FIG. 11 further illustrates the non-linear scan ramp generator 161 which is essentially a circuit similar to the time gain amplifier of FIG. 8. Thus, input on lead 188a is derived from masterclock 186 (FIG. 7) and applied via counter 308 to ramp function network 310. The ramp function network 310 may be such as a read only memory, type 2704, that is pre-programmed for the particular non-linear curve function, e.g. as depicted in FIG. 10. Selected curve outputs may then be conducted by multi-position switch 312 for input to a counter 314 which, in turn, provides output via lead 316 and switch 201 to the multiplying digital-to-analog converter 198 (see FIG. 7). Converter 198 then generates the non-linear scan ramp voltage for input on lead 200 to comparator 212.

The counter 308 and 314 may be similar integrated circuit devices to those utilized at the similar count positions of FIG. 8, i.e. counters 216 and 222. SET input on lead 304 from control microprocessor 232 is applied to ramp function network 310 to control sequencing of the network output, and a PRESET input, an eight bit binary input, is applied on connector 306 to counter 314.

In FIG. 11, the counter 308 divides the master clock pulses on lead 188a down to four times the pulse repetition rate. The ramp function network 310 contains the particular ramp function in storage as a series of 0's and 1's and each clock pulse input to ramp function network 310 causes one bit to be read from the memory. Thus, the succeeding counter 314 is incremented on input of each 1 bit. The output 316 of counter 314 is then applied to multiplying D/A converter 198 (FIG. 7) that converts the signal to the analog ramp voltage for application to comparator 212.

The ramp (non-linear) for each offset can be calculated at the time the offset is shot, or the operator can enter the initial offset and the change in offset along with the total number of offsets and the microprocessor can calculate all offset scan ramps at once. The only other pieces of information necessary for the calculation are the full scale window length and the velocity of the medium. These are readily inserted by the operator as the velocity for the particular coal body is pre-determined for the sounding operation.

Figure 12:
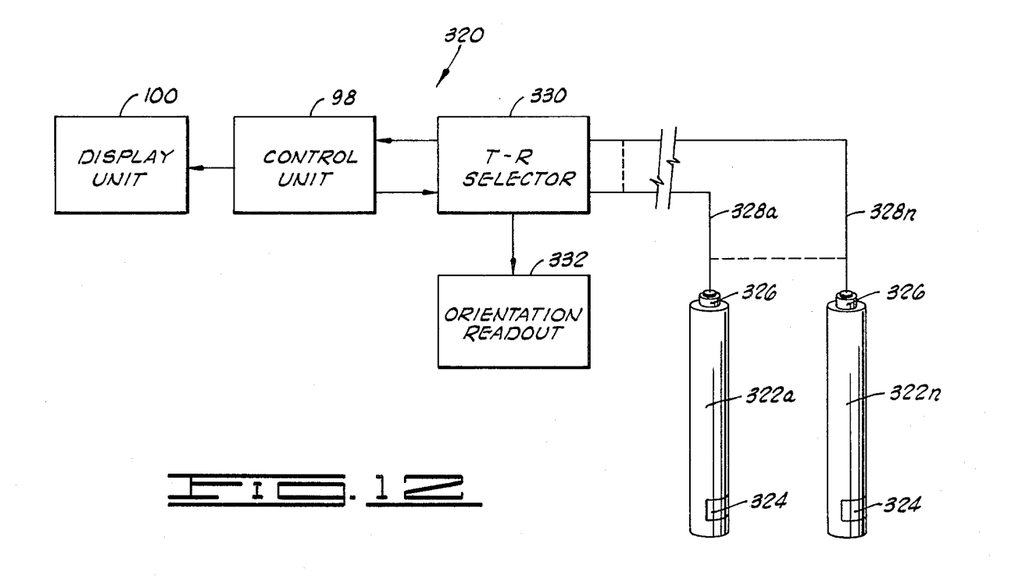
FIG. 12 is a block diagram of earth probing radar equipment as adapted for borehole usage.

FIG. 12 illustrates a modified earth probing radar equipment 320 which is suitable for variously probing earth subterrain by means of borehole utilization. Each of a transmitter 92 and receiver 96 (FIG. 4) are suitably disposed within respective tubular housings 322a through 322n. Tubular housings 322a-322n may each include a suitable radiation transparent window 324 adjacent the radar antenna.

Each of the borehole housings 322a through 322n may be connected through a suitable line connector 326 to a respective reinforced supporting cable 328a through 328n for connection at an operating position to a T-R selector 330. T-R selector 330 may then supply selected input and output to control unit 98 and display unit 100 (see FIG. 4). It is also desirable that the tubular housings 322a through 322n each include a conventional form of borehole azimuth and/or attitude readout device for conduction of directional data to an orientation readout 332, e.g. a chart recorder or the like. Thus, the tubular housing 322a through 322n may be inserted in selected boreholes and incrementally lowered therealong as successive radar readings are taken, and T-R selector 330 may be further actuated to control radar transmission direction as between the selected boreholes as azimuthal orientation readout is recorded at readout 322. Still further options are available as a single borehole of selected directivity may be utilized with a single tubular housing 322 whereupon transmission and reception are effected from within the singular housing assembly, or serially aligned and spaced housings 322 may be advanced along a single borehole.

Figure 13:
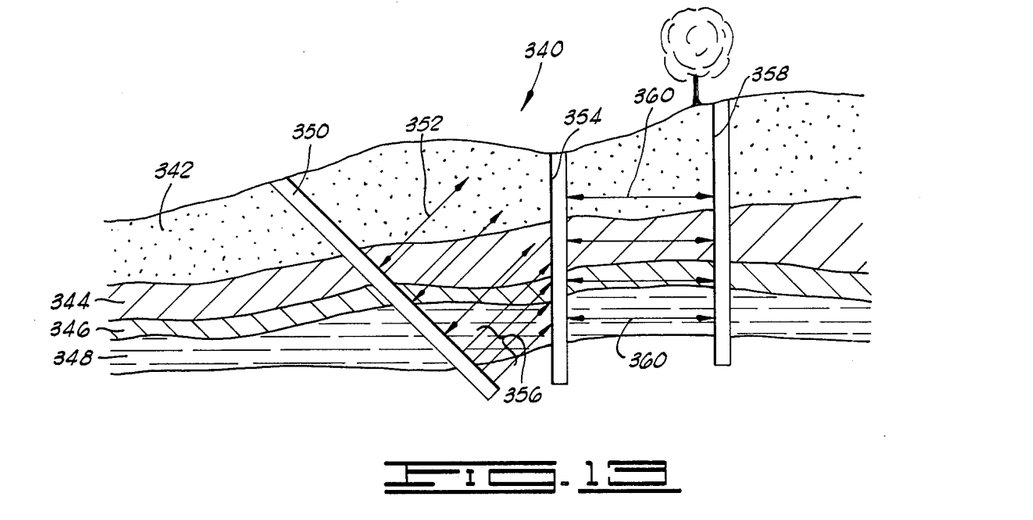
FIG. 13 is an idealized depiction of an earth cross section showing selected near surface strata and diverse boreholes with energy propagation shown in arrows.

FIG. 13 illustrates an earth formation 340 and selected near-surface strata, e.g. a weathering or near-surface layer 342, a shale stratum 344, a coal seam 346 and underlying stratum 348, normally yet another shale stratum. Depending upon the exigencies of the particular surveillance operation, selected boreholes may be run. For example, a diagonal borehole 350 may extend downward a selected depth whereupon a tubular radar housing 322 may be periodically energized at selected distances therealong to provide a plurality of transmission-return readings as might be taken along arrows 352. Additionally, borehole 350 may be utilized in combination with a proximate borehole 354 as transmission is originated at selected points 356 along borehole 350 while reception is detected along borehole 354. The directivity of transmission and reception offsets as between boreholes 350 and 354 is readily controlled by means of T-R selector 330 (FIG. 12) as intervening voids, discontinuities and stratum interfaces are indicated in the data readout.

In borehole probing mode, the equipment is still operated to maintain known offsets as between source and reception positions, either by incremental movements of transmitter, receiver or both. Thus, all received data may undergo stack processing to achieve the desirable signal enhancement.

In like manner, two vertical boreholes such as borehole 354 and a proximate borehole 358 may be utilized to realize earth probing radar transmission as between the boreholes in either or both directions as selected by T-R selector 330, equispaced transmission paths being shown by arrows 360. Thus, one or more boreholes may be formed from the earth surface at any selected angle with selected directivity of transmission and reception to provide complete data readout as to anomalies and discontinuities in the subterrain traversed by the transmitted energy. Transmission offset relationships may be maintained by variation of either or both of the transmitter and receiver housings.

Figure 14:
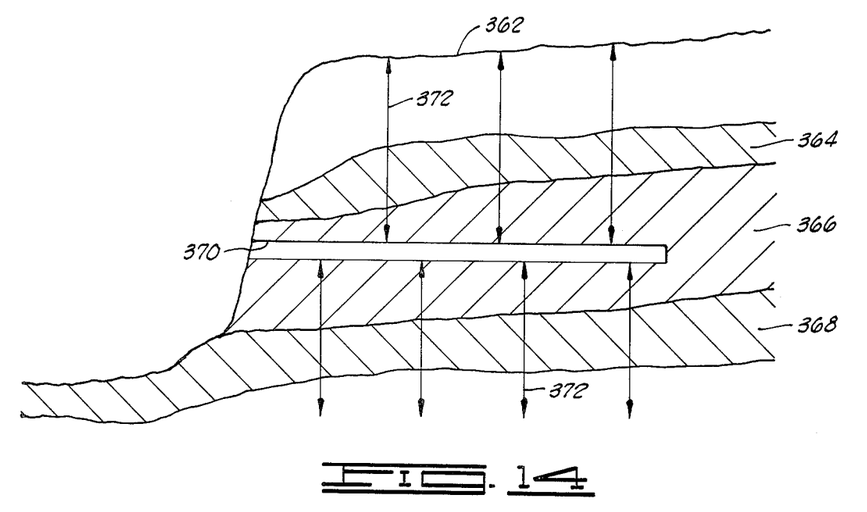
FIG. 14 is a cross section of high wall earth formation illustrating longitudinal borehole formation and energy propagation.

FIG. 14 illustrates a high wall situation as is often encountered in open pit mining wherein the high wall portion of the earth's surface 362 overlays selected substrata 364, 366, and 368. A selected horizontal borehole 370 may then be formed back through the high wall with equi-spaced transmission and reception of radar energy as indicated generally by lines 372. Additionally, and in the manner of FIG. 13, two or more generally horizontal boreholes 370 may be formed through the high wall to provide one way transmission of probing radar energy with specific offset spacing and selected directivity as controlled by T-R selector 330 for the one or more radar probe housings 322a-322n (FIG. 12).

Figure 15:
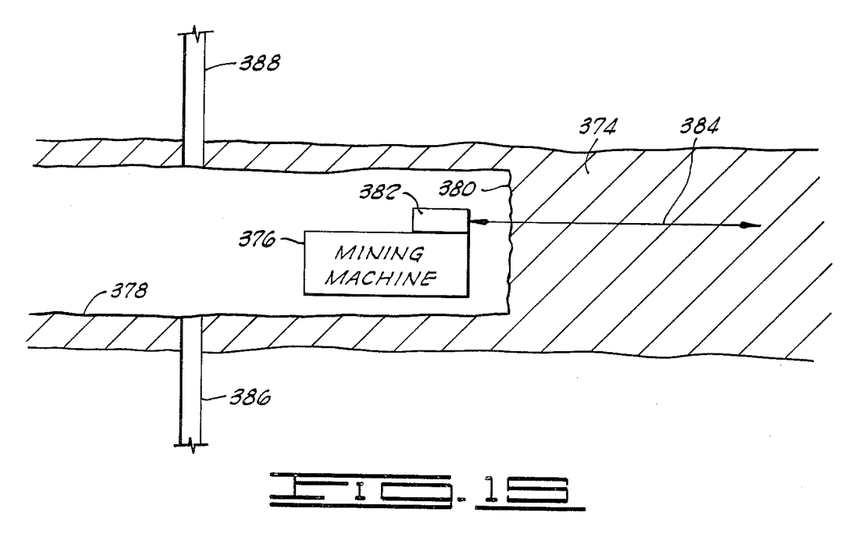
FIG. 15 is a general illustration of a tunnel mined coal seam in section with representative borehole formations.

Finally, FIG. 15 illustrates an underground mining situation within a coal seam 374 wherein a mining machine 376 operates within a tunnel 378 at a mine face 380. An earth probing radar unit 382 may then be mounted forward-looking in mining machine 376 to provide continual surveillance ahead of the mining machine through mineface 380 as indicated by arrow 384. In addition, tubular radar housings may readily be controllably inserted into boreholes formed in the face, rib, roof or floor of tunnel 378, as is generally illustrated by floor and roof boreholes 386 and 388, respectively.

The foregoing discloses a novel ground probing radar method and apparatus which is readily employed in determining the condition and homogeneity of coal in situ. The invention may be utilized directly at the mine face, either tunnel or pillar disposition, and it enables accurate surveillance of the coal body immediately ahead of the mining machinery. Alternatively, the system may be employed in a scheme utilizing one or more boreholes of selected directivity to provide an exploration detail of selected subterrain. In addition, the method and apparatus employ a signal processing scheme, including common reflection point processing, which achieve accurate and reliable signal return at ranges heretofore not possible.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A method for determining condition and homogeneity of the structure of coal seams, comprising:
   transmitting pulsed electromagnetic energy into the face of a coal seam;
   receiving said energy transmitted into said face to develop a return signal per transmitted pulse;

processing selected successive return signals to eliminate source coherent interference while increasing the signal to noise ratio; and indicating visually any structural inhomogeneities within said coal seam.

2. A method as set forth in claim 1 wherein:

said transmitting is effected with repetitive pulses at each of a plurality of source positions that are spaced at selected known locations along said face; and said receiving is effected in at least one location having known offset position relative to each of said source positions.

3. A method as set forth in claim 2 wherein:

said coal seam face is a selected rib of a coal pillar; and said transmitting is effected at another rib of said coal pillar.

4. A method as set forth in claim 2 wherein:

said coal seam face is a selected rib of a coal pillar; and said transmitting is effected with said receiving effected on the same rib of said coal pillar.

5. A method as set forth in claim 1 wherein:

said transmitting is effected in at least one position to propagate repetitive pulses of radio energy; and said receiving is effected at each of a plurality of receiving positions that are spaced at selected known locations relative to said at least one transmitting position.

6. A method as set forth in claim 5 wherein:

said coal seam face is a selected rib of a coal pillar; and said receiving is effected at another rib of said coal pillar.

7. A method as set forth in claim 5 wherein:

said coal seam face is a selected rib of a coal pillar; and said receiving and said transmitting is effected on the same rib of said coal pillar.

8. A method as set forth in claim 1 which includes the further step of:

compositing selected repetitive return signals having the same transmitting and receiving positions relative to said face of the coal seam.

9. A method as set forth in claim 2 wherein:

said processing is a stacking summation enabling output indication of common reflection point return signal data.

10. A method as set forth in claim 9 wherein:

said common reflection point return signal data is indicated for each transmitting source position relative to a receiving position at known offset.

11. A method as set forth in claim 5 wherein:

said processing is a stack summation enabling output indication of common reflection point return signal data.

12. A method as set forth in claim 11 wherein:

said common reflection point return signal data is indicated for each receiving position relative to a transmitting source position at known offset.

13. A method for determining condition and homogeneity of earth structure proximate coal deposits, comprising:

forming at least one borehole of selected attitude through said earth structure;

transmitting pulsed electromagnetic energy into the wall of said at least one borehole at a selected position therealong;

receiving said energy transmitted into said wall to develop a return signal per transmitted pulse;

processing selected successive return signals to eliminate source coherent interference while increasing the signal to noise ratio; and indicating visually any structural inhomogeneities within said earth structure.

14. A method as set forth in claim 13 wherein:

said transmitting is effected with repetitive pulses at each of a plurality of source positions that are spaced at selected known locations along said at least one borehole; and said receiving is effected in at least one location having known offset position relative to each of said source positions.

15. A method as set forth in claim 14 wherein:

said receiving is effected in a different borehole than said transmitting.

16. A method as set forth in claim 13 wherein:

said transmitting is effected at a source position in at least one borehole to propagate repetitive pulses of radio energy; and said receiving is effected at each of a plurality of receiving positions along said at least one borehole that are spaced at selected known locations relative to said transmitting position.

17. A method as set forth in claim 16 wherein:

said receiving is effected in a different borehole than said transmitting.

18. A method as set forth in claim 13 which includes the further step of:

compositing selected repetitive return signals having the same transmitting and receiving positions relative to said earth structure.

19. A method as set forth in claim 14 wherein:

said processing is a stacking summation enabling output indication of common reflection point return signal data.

20. A method as set forth in claim 19 wherein:

said common reflection point return signal data is indicated for each transmitting source position relative to a receiving position at known offset.

21. A method as set forth in claim 16 wherein:

said processing is a stack summation enabling output indication of common reflection point return signal data.

22. A method as set forth in claim 21 wherein:

said common reflection point return signal data is indicated for each receiving position relative to a transmitting source position at known offset.

23. Apparatus utilizing radio energy for determining the character of earth structure, comprising:

transmission means including directive antenna energized at a selected repetition rate for propagating pulsed radio energy into an earth structure at an exposed face thereof;

receiver means including antenna for receiving the reflected radio energy from said earth structure;

means enabled at said repetition rate to generate a non-linear sampling rate;

means amplifying and sampling the reflected energy signal at said non-linear rate to provide a reduced frequency receiver signal;

means for selective band pass filtering and time gain amplification of said receiver signal to generate a time analog return signal;

means selectively operable to receive input of said time analog return signal for analog to digital conversion and time coincident signal compositing to produce a digital return signal; and means for recording and displaying the selected one of said time analog and digital return signals with enhanced rejection of both random and source coherent noise.

24. Apparatus utilizing radio energy for determining the character of earth structure, comprising:

transmission means including directive antenna for propagating radio energy pulses at a preset pulse repetition frequency into an earth structure exposed face in at least one source position;

receiver means including antenna for receiving pulse radio energy in at least one receiver position in said earth structure;

means for amplifying the received radio energy signals to produce a return signal for each transmitted pulse;

means for generating a real time ramp voltage at the pulse repetition frequency with ramp duration at a preselected time window length;

scan ramp generator means including a multiplexing digital to analog converter for generating a scan ramp voltage at a preselected submultiple of said pulse repetition frequency;

means comparing said real time ramp voltage and said scan ramp voltage to generate a plurality of sample rate pulses;

sampling means receiving said amplified return signals and responsive to said sample rate pulses to generate a return trace output;

recorder and display means; and microprocessor means receiving said return trace and providing data output in record format to said recorder and display means.

25. Apparatus as set forth in claim 24 wherein said scan ramp generator means includes:

first counter means providing first counter output at said submultiple of the pulse repetition frequency; and switch means applying said first counter output to said multiplying digital to analog converter means to generate a linear upsweep scan ramp voltage.

26. Apparatus as set forth in claim 24 wherein said scan ramp generator means includes:

second counter means providing second counter output at a preselected submultiple of the pulse repetition frequency; and switch means applying said second counter output to said multiplying digital to analog converter to generate a non-linear upsweep scan ramp voltage.

27. Apparatus as set forth in claim 24 wherein said scan ramp generator means includes:

first counter means receiving clock pulse input to produce a divided output;

a ramp function network receiving said divided output and enabled by set input from said microprocessor means to provide a pre-programmed binary pulse output indicative of source-receiver offset as a function of propagation velocity of the earth structure; and second counter means receiving said binary pulse output and responsive to preset input from said microprocessor means to generate said non-linear rate pulse input to said multiplying digital to analog converter means.

28. Apparatus as set forth in claim 25 which further comprises:

amplifier means receiving the sampled return trace output;

high pass active filter means receiving the amplifier means output signal;

low pass active filter means receiving output from said high pass means;

time gain amplifier means receiving output from said low pass means to generate an analog return trace for input to said microprocessor means.

29. Apparatus as set forth in claim 28 which further includes:

means for conducting said analog return trace from said time gain amplifier means directly to said recorder and display means.

30. Apparatus as set forth in claim 28 which further includes:

analog to digital converter means receiving said analog return trace and providing digital data input to said microprocessor means.

* * * * *

UNITED STATES PATENT AND TRADEMARK OFFICE
CERTIFICATE OF CORRECTION

PATENT NO. : 4,430,653

DATED : February 7, 1984

INVENTOR(S) : Julian B. Coon et al

It is certified that error appears in the above-identified patent and that said Letters Patent are hereby corrected as shown below:

Claim 28, line 1, "25" should read --24--.

Signed and Sealed this

Twenty-ninth Day of May 1984

[SEAL]

Attest:

Attesting Officer

GERALD J. MOSSINGHOFF

Commissioner of Patents and Trademarks